United States Patent [19]

Bagley, Jr.

[11] 4,023,643

[45] May 17, 1977

[54] DECELERATION-RESPONSIVE PASSENGER-RESTRAINING DEVICE FOR MOTOR VEHICLES

[76] Inventor: William H. Bagley, Jr., 3032 Morningview Terrace, Birmingham, Mich. 48010

[22] Filed: Oct. 30, 1972

[21] Appl. No.: 302,214

[52] U.S. Cl. .............................. 180/103 A; 60/638; 188/1 R; 280/753; 403/109

[51] Int. Cl.[2] ........................................ B60R 21/08

[58] Field of Search ................. 180/103 A, 82, 1 R; 287/58 CT; 280/753, 748, 751; 60/632, 635, 638

[56] References Cited

UNITED STATES PATENTS

| 326,695 | 9/1885 | Wardwell | 287/58 CT |
|---|---|---|---|
| 2,322,755 | 6/1943 | Voorhies | 280/150 B |
| 2,768,003 | 10/1956 | Apel | 280/150 B |
| 2,781,203 | 2/1957 | Kurilenko | 280/150 AB |
| 3,105,702 | 10/1963 | Larson | 280/150 B |
| 3,210,931 | 10/1965 | Elzufon et al. | 60/26.1 |
| 3,239,255 | 3/1966 | Murcott | 287/58 CT |
| 3,441,103 | 4/1969 | Lymar | 280/150 AB |
| 3,588,140 | 6/1971 | Chute | 280/150 AB |
| 3,623,768 | 11/1971 | Capener | 280/150 AB |
| 3,633,936 | 1/1972 | Huber | 280/150 B |
| 3,642,303 | 2/1972 | Irish | 280/150 AB |
| 3,715,130 | 2/1973 | Harada et al. | 280/150 AB |
| 3,731,843 | 5/1973 | Anderson | 280/150 AB |
| 3,734,441 | 5/1973 | Lux | 287/58 CT |
| 3,767,229 | 10/1973 | Cain | 280/150 AB |

FOREIGN PATENTS OR APPLICATIONS

| 896,312 | 10/1953 | Germany | 280/150 AB |
|---|---|---|---|
| 342,485 | 12/1959 | Switzerland | 280/150 B |
| 1,171,770 | 11/1969 | United Kingdom | 280/150 B |

*Primary Examiner*—Joseph F. Peters, Jr.
*Assistant Examiner*—John P. Silverstrim
*Attorney, Agent, or Firm*—Willis Bugbee

[57] ABSTRACT

A horizontal passenger-restraining padded buffer (FIGS. 1 and 2) extends transversely across the front portion of the automobile passenger compartment adjacent to and overlying the cowl. This buffer is mounted on the outer ends of the piston rods of a pair of rearwardly-facing pneumatic cylinders tiltably mounted in spaced parallel relationship on the fire wall of the vehicle. The rearward chambers of the cylinders contain air and the normal retracting positions of the pistons are adjacent the forward ends of the cylinders. Secured to the forward end of each cylinder and communicating with the forward chamber thereof is an explosive gas generator which contains a cartridge chamber for a pistol blank cartridge adapted to be fired by a reciprocable firing pin actuated by an electrical solenoid to the armature of which it is attached. The solenoid is connected with a deceleration-responsive inertia switch which upon sudden deceleration of the vehicle closes the circuit to the solenoid winding, the energization of which propels the armature-connected firing pin sharply outward into contact with the detonator of the center-fire cartridge, firing it. The explosive gases generated by the firing of the cartridge enter the forward chamber of each cylinder. As a consequence, the piston heads of the two cylinders and their piston rods, together with the theretoconnected buffer, are propelled instantly at high speed rearwardly, against the passenger or passengers in the front seat of the automobile, at the same time compressing the air in the rearward chambers of the cylinders and forcing it through escape ports. The buffer thus counteracts the inertia of their bodies and holds them firmly against the back of the front seat, preventing them from plunging forward and preventing injury.

8 Claims, 9 Drawing Figures

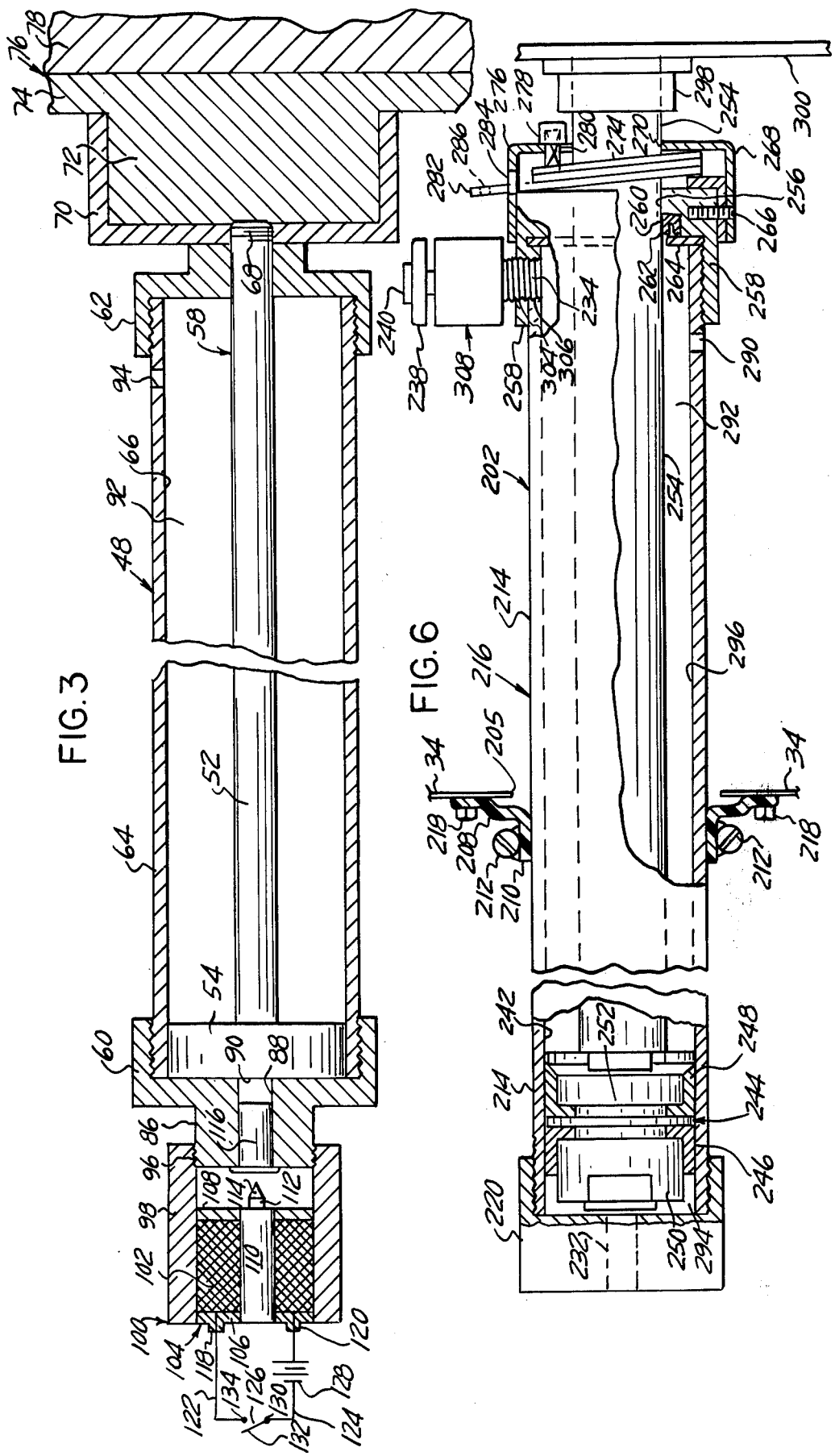

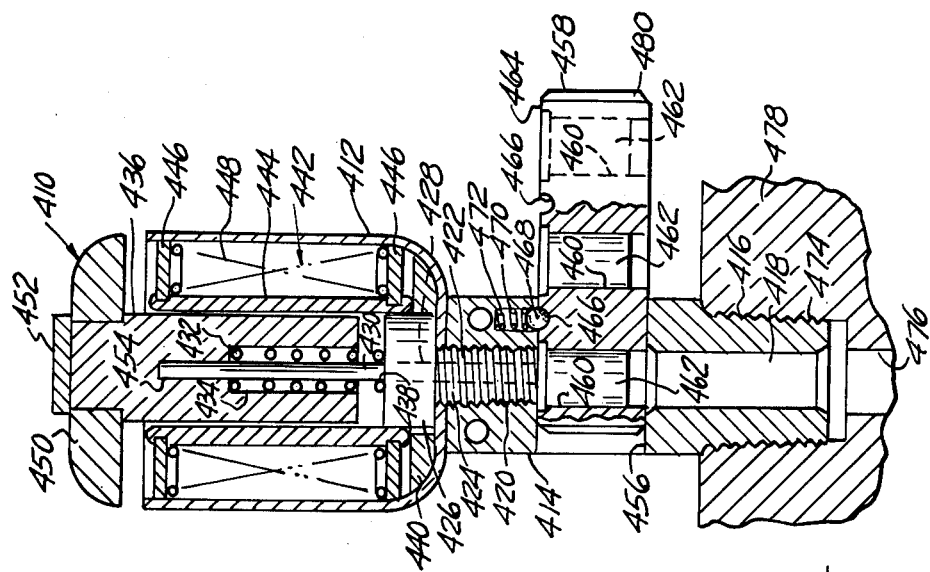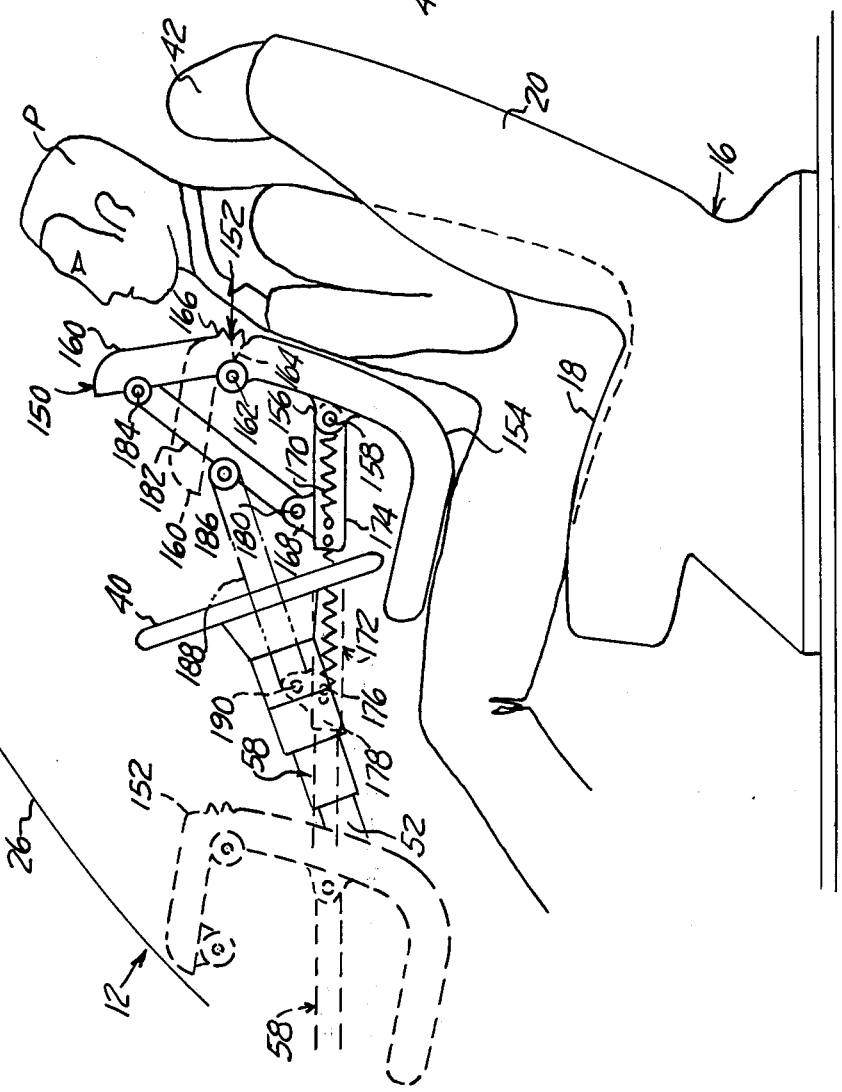

DECELERATION-RESPONSIVE PASSENGER-RESTRAINING DEVICE FOR MOTOR VEHICLES

BACKGROUND OF THE INVENTION

Hitherto, many deaths and serious injuries have been caused by sudden deceleration of motor vehicles resulting either from sudden and violent brake action to avoid an impending collision or from an actual collision itself. Prior efforts have been made to cushion the front seat passengers (which term includes the driver) against the effects of being thrown forward against the door posts, windwhield header, windshield or steering wheel. One such effort has involved the so-called air bag device intended to suddenly inflate an air bag on or under the cowl but such air bag devices are of doubtful dependability in a collision, and provide no protection to the front seat passengers in the event of a sidewise roll-over of the vehicle. Moreover, such air bags do not hold the passengers either down against the seat bottom or against the seat back, and take the control of the vehicle out of the hands of the driver.

SUMMARY OF THE INVENTION

The present invention set forth above in the abstract of the disclosure holds each passenger not only downward against the seat bottom but also rearward against the seat back and automatically locks in its rearward position so that the passengers are protected not only against injury from a sidewise roll-over but also from being thrown around inside the passenger compartment. Furthermore the present invention enables the driver to keep control of the vehicle in his own hands and enables him to keep his hands on the steering wheel, which is unaffected by the buffer because the buffer has a cutout portion enabling it to pass by the steering wheel.

In the drawings,

FIG. 3 is an enlarged central vertical section through one of the actuating cylinders and its connected parts as employed in the passenger-restraining arrangement of FIGS. 1 and 2;

FIG. 4 is a view similar to FIG. 1 but showing a modified second form of the invention, with the retracted positions of the working parts shown diagrammatically in dotted lines;

FIG. 6 is a side elevation, partly in central vertical section, through one of the actuating cylinders of the third form of the invention shown in FIG. 5, with the explosive gas generators omitted for simplification of the disclosure;

FIG. 7 is an enlarged longitudinal section through a modified explosive gas generator having a multiple-cartridge magazine therein;

Figure 5:
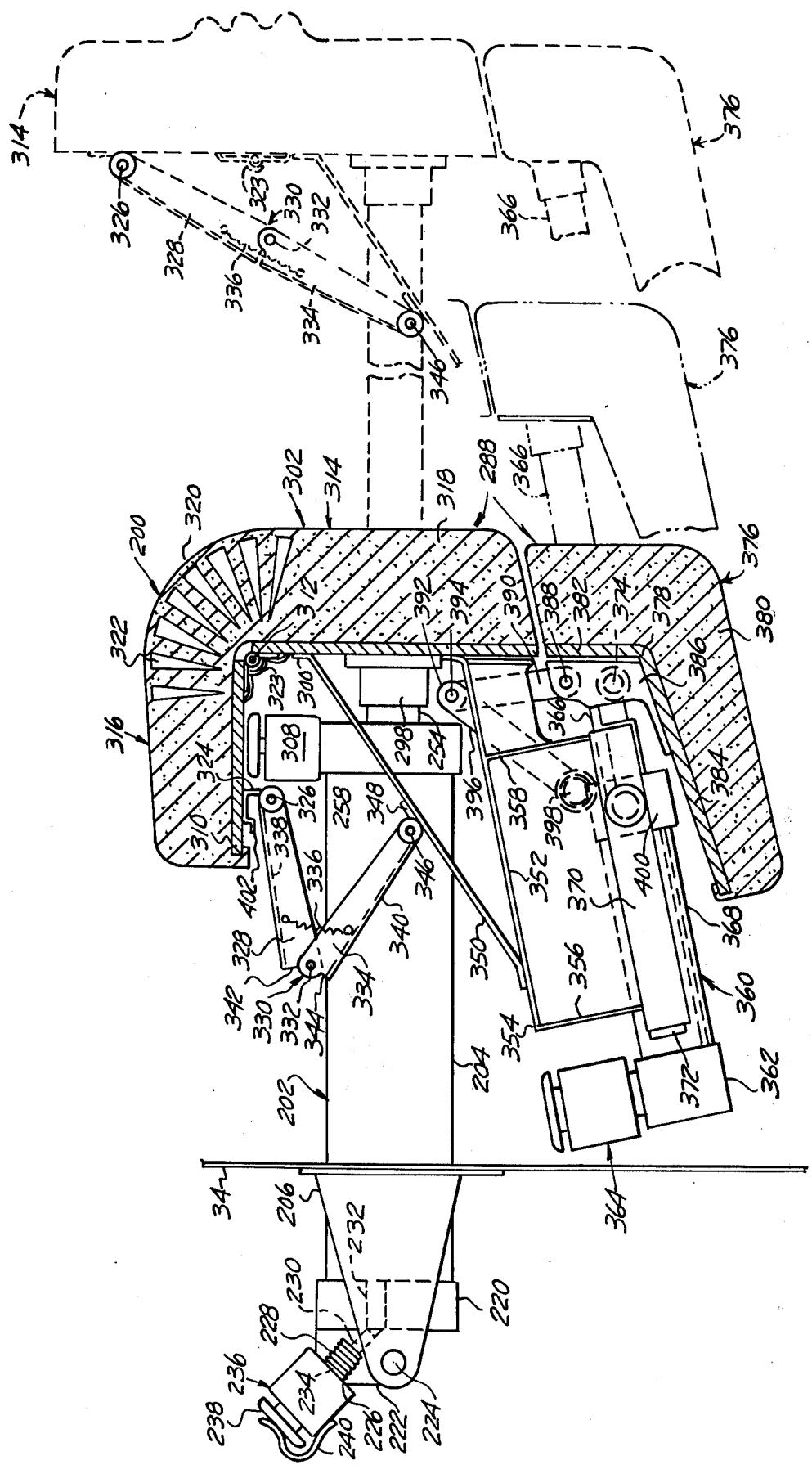
FIG. 5 is an enlarged central vertical section, partly in side elevation, of a further modified third form of the invention, with the retracted positions of the working parts shown in solid lines and with the projected positions thereof shown in dotted lines.
Figure 9:
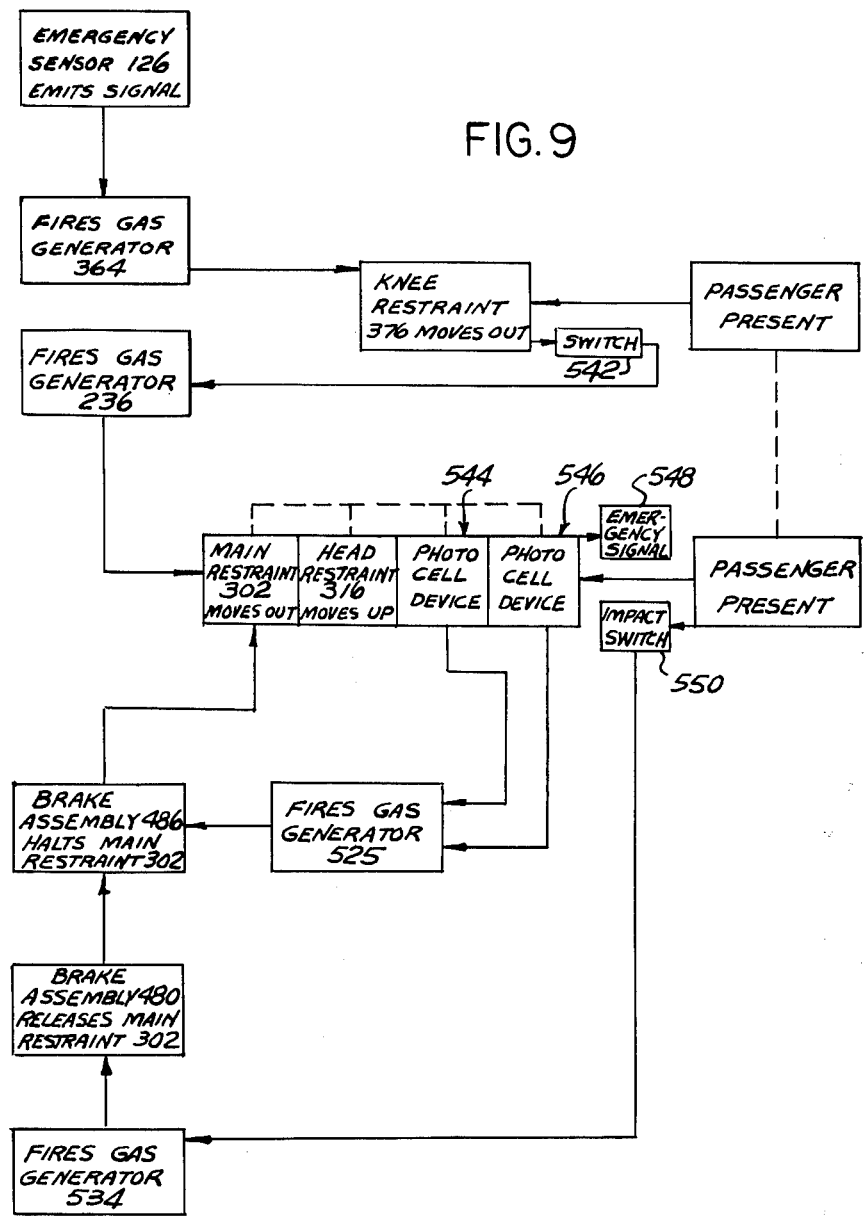
Figure 8:
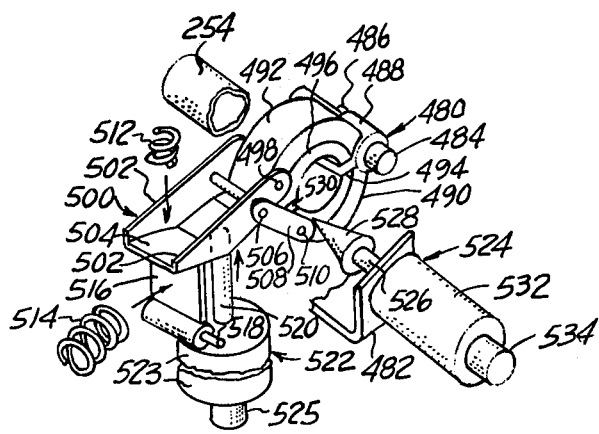

FIG. 8 is a perspective view of a cartridge-applied and cartridge-released brake adapted to be installed upon the piston rod of the reciprocatory operating motor of the deceleration-responsive passenger restraining device of the invention, with the operating cylinder omitted to simplify the view; and FIG. 9 is an amplified flow diagram showing the operative relationships and sequence of the third form of the invention shown in FIG. 5, with the further addition of the brake of FIG. 8 and certain photocells adapted to increase the speed of operation of the FIG. 5 device.

SIMPLIFIED DECELERATION-RESPONSIVE PASSENGER-RESTRAINING DEVICE.

Figure 1:
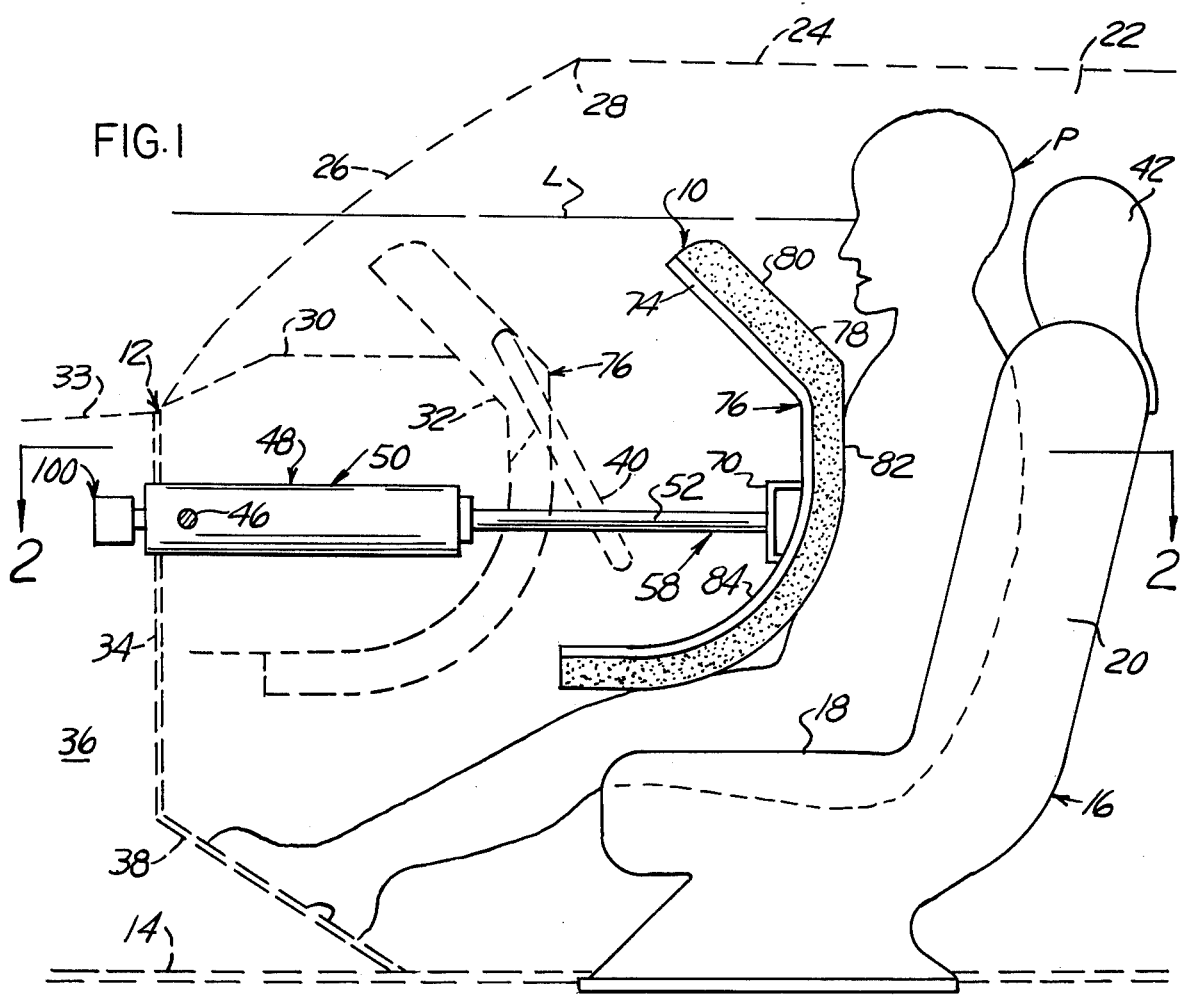
FIG. 1 is a longitudinal vertical section through the front passenger compartment of an automobile taken along the line 1—1 in FIG. 2 immediately inside the left front window, showing one form of deceleration-responsive passenger restraining device according to the invention, with the working parts shown in their projected positions in solid lines and in their retracted positions in dotted lines.
Figure 2:
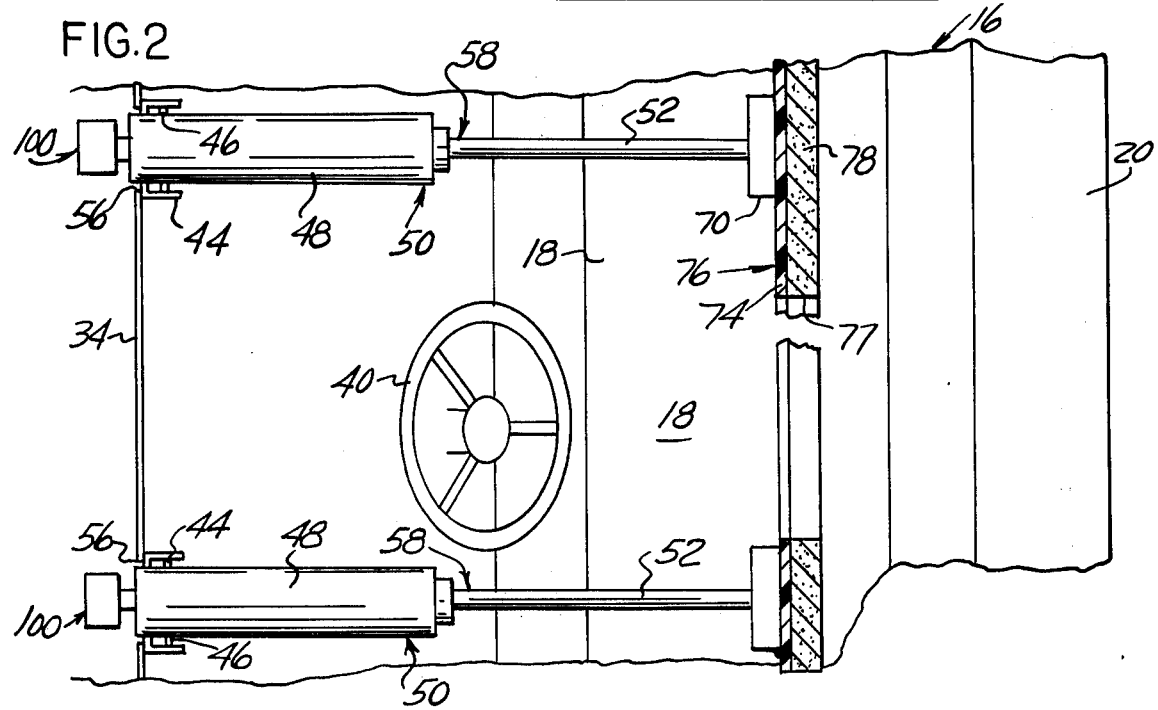
FIG. 2 is a horizontal section taken along the line 2—2 in FIG. 1.

Referring to the drawings in detail, FIGS. 1, 2 and 3 show a simplified deceleration-responsive passenger-restraining device, generally designated 10, for a motor vehicle 12, the parts of which are shown diagrammatically in order to simplify the disclosure. The motor vehicle 12 has a floor 14 supporting a front seat 16 provided with a seat bottom 18 and a seat back 20 in a passenger compartment 22. The motor vehicle 12 has a roof 24 and windshield 26 with a windshield header 28 at the upper end and a cowl 30 with an instrument panel 32 and a hood 33 and fire wall or bulkhead 34 separating the engine compartment 36 from the passenger compartment 22 and extending downward to a footboard 38 inclined relatively to the floor 14. The operating pedal or pedals (not shown) are disposed near the footboard 38 and the usual steering wheel 40 is mounted on the usual steering post 42 extending downward beneath the cowl 30 and through the fire wall or bulkhead 34 into the engine compartment 36 where it is connected to the conventional steering mechanism and linkage. The front seat 16 is provided with the usual head rest 42 for the passenger P who in this instance is shown as the driver of the motor vehicle 12.

Bolted or otherwise secured to the firewall or bulkhead 34 (FIG. 2) are two U-shaped pivot brackets 44 which pivotally support the trunnions 46 projecting laterally from the opposite sides of the cylinders 48 of reciprocatory fluid pressure motors, generally designated 50, having piston rods 52 with piston heads 54 (FIG. 3). The forward ends of the cylinders 48 extend through openings 56 in the bulkhead 34 which are made dust-tight by sliding cover plates (not shown) attached to the cylinders 48 and slide upward and downward as the cylinders 48 pivot on their trunnions 46. The term "reciprocatory motor" 50 is used herein instead of the frequently-employed term "cylinder" representing both the cylinder 48 and the piston rod 52 and piston head 54 which, collectively constitute plungers 58, in order to avoid the confusion arising by the use of the same term "cylinder" for both the hollow cylindrical body 48 and an assembly including that part with the piston rod 52 and piston head 54 therein. The cylinder 48 (FIG. 3) has forward and rearward cylinder heads 60 and 62 respectively threaded onto the correspondingly threaded ends of the cylinder barrel 64. The piston head 54 is reciprocable within the cylinder bore 66 and the piston rod 52 at its outer end is threaded as at 68 into a cup-shaped fitting 70 which in turn is secured as by suitable fasteners or adhesives (not shown) to correspondingly-shaped bosses 72 projecting forwardly of the vehicle from the base plate 74 of a composite passenger-restraining buffer, generally designated 76, faced with a foam rubber or foam plastic pad 78. The buffer 76 extends entirely across the front passenger compartment and is of roughly C-shaped or channel-shaped cross-section (FIG. 1) having a forwardly-inclined upper portion 80, a vertical midportion 82 and an arcuate lower portion 84. The buffer 76 terminates at its upper edge slightly below the line of sight L of the paassenger P and has an opening 77 therein providing clearance for the steering wheel 40 (FIG. 2) (shown inward of its usual position to avoid concealing the parts below it.) A similar opening (not shown) in the buffer 76 affords visibility of the instruments on the instrument panel 32.

The forward cylinder head 60 (FIG. 3) is provided with a central cylindrical boss 86 containing a central bore 88 opening into the forward end of the cylinder 48 to the left of the piston head 54 in the space constituting the forward cylinder chamber 90, whereas the opposite side of the piston head 54 faces the rearward cylinder chamber 92 containing air. The cylinder barrel 64 near its junction with the cylinder head 62 is provided with an air discharge port 94. Threaded or otherwise secured as at 96 to the boss 86 is the cylindrical casing 98 of an explosive gas generator, generally designated 100, within which is mounted the winding 102 of a solenoid 104 having opposite end discs 106 and 108 secured to the casing 98 and also to a tubular core 110 of non-magnetic material. Reciprocable within the tubular core 110 is the spring-retracted armature 112 composed of magnetic material such as soft iron and having a pointed tip 114. The armature 112 constitutes a firing pin, the pointed tip 114 of which, when the solenoid 104 is energized, is impelled into engagement with the center of a center-firing pistol cartridge 116, such as a 38-caliber pistol cartridge seated in the central bore 88 of the cylinder head boss 86.

The terminals 118 and 120 of the solenoid 104 (FIG. 3) are connected by lines 112 and 124 to an inertia-operated micro-switch 126, with a battery 128 connected in the line 124 between the solenoid terminal 120 and the switch blade contact 130 of the switch 126. The blade 132 in its closed position engages the switch terminal or contact 134 to which the line 122 runs from the solenoid terminal 118.

In the operation of the deceleration-responsive passenger-restraining device 10 of FIGS. 1, 2 and 3, let it be assumed that the buffer 76 is in its retracted position against and overlying the cowl 30 and instrument panel 32, as shown in dotted lines in FIG. 1, and that a cartridge 116 is in its operating position of FIG. 3 in the bore 88. Let it also be assumed that a sudden emergency causing drastic braking decelerates the motor vehicle violently or an actual collision does so, resulting in closing of the inertia-operated micro-switch 126 (FIG. 3) so that its blade 132 interconnects the contacts 130 and 134, whereupon the electric current from the battery 128 energizes the winding 102 of the solenoid 104. As a result, the armature 112 springs rearwardly against the center fire cartridge 116, detonating it and consequently firing its explosive charge. The explosive gases emerging from the cartridge 116 through the bore 88 into the forward chamber 90 of each cylinder 48 act against each piston head 54 to impel the plungers 58 rearwardly with an almost instantaneous reaction, propelling the buffer 76 rearwardly into its solid line position shown in FIGS. 1 and 2. This action causes the buffer 76 to force the passengers P rearwardly and downwardly and to hold them against the back 20 and bottom 18 of the front seat 16. The driver, however, still retains control of his steering wheel 40 through the opening 77 in the buffer 76.

Meanwhile, the air compressed in the rearward chamber 92 of the cylinders 48 escapes through the port 94 near the rearward end thereof. At the same time, the cylinders 48 pivot on their trunnions 46 and tilt upward as the arcuate lower portion 84 moves upward along the legs of the passenger P.

Modified Passenger-Restraining Device with Articulated Buffer.

The modified deceleration-responsive passenger-restraining device, generally designated 150, shown in FIG. 4 is generally similar to the first form 10 thereof shown in FIGS. 1, 2 and 3, insofar as the reciprocatory fluid pressure motors 50 and their plungers 58 are concerned. Accordingly these parts are designated with the same reference numerals as in FIGS. 1, 2 and 3. The articulated buffer 152, however, differs from the unitary buffer 76 of the arrangement 10 by having a lower portion 154 of arcuate cross-section having ears 156 pivotally connected by pivot pins 158 to the forward end of the plunger 58. The upper portion 160 is pivoted at 162 to the arcuate lower portion 154 and is separable therefrom along a parting line 164. The space between the upper and lower buffer portions 160 and 154 is filled by a flexible covering portion 166 which in the raised position of the upper part 160 puckers like an accordion. Slidably mounted on the piston rod 52 of the plunger 58 is a crosshead 168 having tension springs 170 and 172 connected to opposite sides thereof. The spring 170 is connected to the ears 156 at one end and at 174 to the crosshead 168 at the other end. The spring 172 at one end is also connected at 174 to the crosshead 168 and at its opposite end is connected at 176 to a crosshead 178 fixedly mounted on the piston rod 52. Pivoted at 180 to the slidable crosshead 168 is the lower end of a link 182, the upper end of which is pivoted at 184 to the upper end of the upper part 160 of the buffer 152. Pivoted at 186 to the approximate midportion of the link 182 is the upper end of an operating link 188, the lower end of which is pivoted at 190 to the crosshead 178.

In the operation of the modified deceleration-responsive passenger-restraining device 150, let it again be assumed that the buffer 152 is in its retracted position shown in dotted lines at the left-hand side of FIG. 4, and that as in the passenger-restraining device 10 of FIGS. 1, 2 and 3, an explosive cartridge is in each explosive gas generator (not shown) as in the generators 100 in FIGS. 1, 2 and 3. Let it also be assumed that a sudden emergency requires or causes violent deceleration of the motor vehicle 12, resulting in the closing of the inertia-operated microswitch 126 (FIG. 3) which in turn energizes the solenoid winding 102 and causes the armature 112 thereof to detonate the cartridge 116 as before. As a consequence, the explosive gases from the cartridge 116 again move the plungers 58 rearward of the vehicle 12, carrying with them each crosshead 178. The rearward travel of the crossheads 178 moves the links 188 rearward, thereby raising the upper buffer part 160. At the same time, each plunger 58 through its connection 158 at its forward end with the ears 156, also moves the lower part 154 of the buffer 152 rearwardly against the body of the passenger P, pushing him backward against the seat back 20 and downward against the seat bottom 18. The remainder of the action is similar to that described above for the passenger-restraining device 10.

FURTHER MODIFIED DECELERATION-RESPONSIVE PASSENGER-RESTRAINING DEVICE WITH ARTICULATED MAIN BUFFER AND AUXILIARY BUFFER.

The further modified deceleration-responsive passenger-restraining device, generally designated 200, shown in FIGS. 5, 6 and 7, like the passenger-restraining device 10 of FIGS. 1, 2 and 3, has a pair of reciprocating fluid pressure motors 202 pivotally mounted on twin-armed brackets 206 which in turn are bolted to the fire wall or bulkhead 34. The cylinders 204 of the fluid-pressure motors project rearwardly of the vehicle through openings 205 in the firewall 34 (FIG. 6) and are closed against the entrance of dust by flexible elastomeric collars 208 having tubular flanges 210 secured by fasteners 212 to the barrels 214 of the cylinders 216 of the motors 202. The flexible collars 208 are in turn bonded or bolted as at 218 to the firewall or bulkhead 34. The forward end of each cylinder barrel 214 is threaded and closed by a cylinder head 220 threaded or otherwise secured thereon (FIG. 6).

Bolted or otherwise secured to each forward cylinder head 220 is a supporting block 222 carrying the trunnions 224 by which the cylinders 204 are pivotally mounted on the brackets 206. Each supporting block 222 is provided with an inclined upper face 226 (FIG. 5) from which a threaded counterbore 228 extends obliquely downward, continuing obliquely downward in a bore 230 forming a passageway which communicates with a central bore or passageway 232 (FIG. 6) in the forward cylinder head 220 of the cylinder 216. Threaded into each counterbore 228 is the stem 234 of a main explosive gas generator 236 similar to the explosive gas generator 100 of FIG. 3 and similarly containing an explosive cartridge like the cartridge 116, a solenoid winding like the winding 102 and an armature 112 with firing pin tip 114. The explosive gas generator 236 is closed at its outer end by a cap 238 held in place by a leaf spring 240 secured to the side of the generator 236.

Reciprocably mounted in the bore 242 of each cylinder barrel 214 (FIG. 6) is a compound piston head 244 equipped with oppositely-facing cup-shaped packings 246 and 248 (FIG. 6) held between oppositely-facing cup-shaped heads 250 and 252. Each compound piston head 244 is connected to a piston rod 254 which passes outward through a bore 256 in a rearward piston head 258 threaded or otherwise secured to the rearward end of the cylinder barrel 214. Each cylinder head 258 on its inner side is counter-bored at 260 to receive a packing or shaft seal 262 held in place by a washer 264 disposed between the cylinder head 258 and the rearward end of the cylinder barrel 214. Secured as by fasteners 266 to each rearward cylinder head 258 is a cup-shaped end cap 268 having an end hole 270 for the passage of the piston rod 254. Also secured to each cylinder head 258 between it and the end cap 268 by the same fastener or fasteners 266 is an arcuate flanged stop 272 against which abut a plurality of tilted piston-rod-locking washers 274 for preventing rebound of the piston rod 254. Diametrically opposite each flanged stop 272, its end cap 268 is provided with a compression spring 276 mounted within a hollow cup-shaped spring retainer 278 aligned with a hole 280 in the end cap 268 through which each compression spring 276 engages the stack of washers 274 and urges them inwardly toward the cylinder head 258.

One of the washers 274 is provided with an extension arm 282 which passes outward through a slot 284 in the end cap 268 and is itself provided with a hole 286 to receive the end of an unlocking rod or cable (not shown) which extends to the passenger compartment of the motor vehicle where it can be manipulated by the driver to unlock the washers 274 and permit the buffer assembly 288 (FIG. 5) mounted upon the end of the piston rod 254 to be retracted by the motor vehicle operator following an emergency operation of the passenger-restraining device 200. A port 290 (FIG. 6) near each rearward cylinder head 258 permits the escape of the air from the rearward cylinder chamber 292 when explosive gas from the cartridge passes through the ports or passageways 230 and 232 into the forward cylinder chamber 294, as explained below in connection with the operation of the further modified passenger-restraining device 200. The compound piston head 244 is reciprocable within the cylinder bore 296 in the cylinder barrel 214.

In particular, the rearward end of each piston rod 254 is threaded or otherwise secured within a flanged collar 298 (FIG. 6) which in turn is welded or otherwise secured to a backing plate or supporting plate 300 of an upper or main buffer, generally designated 302 (FIG. 5). Each cylinder head 258 is provided with a hole 304 aligned with a threaded hole 306 in the cylinder barrel 214 for receiving the threaded stem 234 of a retrofiring explosive gas generator 308 similar to the explosive gas generator 236, corresponding parts of which are designated with the same reference numerals. The retro-firing explosive gas generator 308, however, as its name suggests, is fired at a minute interval of time after the firing of the explosive gas generator 236, the explosive gases from the former passing directly into the rearward cylinder chamber 292 when the piston head 244 nears the end of its operating stroke as it approaches the retaining ring 264 (FIG. 6), as determined by a limit switch (not shown) operated by the buffer supporting plate 300 near the end of the stroke of the piston rod 254, as explained below in connection with the operation of the passenger restraining device 200.

The main or upper buffer 302 is mounted on the supporting plate 300, which forms a part thereof and which has an upper movable plate 310 hinged at 312 to the supporting plate 300. A flexible foam plastic or foam rubber pad 314 is secured to the plates 300 and 310. The upper portion 316 of the pad 314 is connected to the lower portion 318 thereof by a bending portion 320 having wedge-shaped internal gusset compartments 322 (FIG. 5) therein to facilitate bending. A torsion spring 323 aligned with the hinges 312 urges the upper pad portion 316 upward toward its vertical position. Secured to and depending from the upper movable plate 310 is a bracket 324 which carries an upper pivot pin 326 to which is pivotally connected the upper end of the upper arm 328 of a collapsible link, generally designated 330. The lower end of the upper arm 328 is connected by a laterally offset intermediate pivot pin 332 to the upper end of the lower arm 334, the two arms being interconnected by a tension spring 336 secured thereto near their outer edges 338 and 340 respectively so as to provide a toggle action tending to yieldably hold the arms 328 and 334 in a straight line position, as shown by the dotted lines on the right-hand side of FIG. 5. For this purpose, the lower end 342 of the upper arm 328 and the upper end 344 of the lower arm 334 form stop surfaces engageable with one another in the straight-line position of the collapsible link 330. The lower end of the lower arm 334 is pivoted as at 346 to bracket 348 (FIG. 5) welded or otherwise secured to a strut 350, the upper end of which is welded or otherwise secured to the supporting plate 300 while the lower end is similarly secured to the upper portion 352 of an F-shaped frame 354, which in turn is bent at its upper end and also welded or otherwise secured to the supporting plate 300 immediately below the flanged collar 298 (FIG. 5).

The lower ends of the parallel arms 356 and 358 of the F-shaped frame 354 are welded or otherwise secured to the upper side of an auxiliary reciprocatory fluid pressure motor 360 upon the forward cylinder head 362 of which is mounted a third or auxiliary explosive gas generator 364 similar in construction, operation and mounting to the explosive gas generator 308 and similarly connected to an energization circuit for its solenoid containing a micro-switch which is closed by the inertia switch 126 (FIG. 3) an instant before the energization of the explosive gas generator 236 so as to propel the piston rod 366 forward to the right in FIG. 5 upon the occurrence of a violent deceleration of the motor vehicle, due either to drastic emergency braking or to an actual collision.

Mounted on one side of the cylinder 368 of the auxiliary reciprocatory fluid pressure motor 360 and parallel to the axis thereof is an elongated guide sleeve 370 (FIG. 5) within which is slidably mounted an auxiliary buffer guide rod 372 which is pivotally connected at 374 to an auxiliary buffer 376 forming the lower portion of the buffer assembly 288. The auxiliary or lower buffer 376, like the main or upper buffer 302, consists of a supporting plate 378 upon which is mounted an auxiliary pad 280 of flexible foam plastic or foam rubber, except that the supporting plate 378 is provided with upper and lower portions 382 and 384 respectively bent at obtuse angles to one another. An obtuse angle bracket 386 is welded or otherwise secured to the obtuse angle supporting plate 378 and carries the pivotal connection 374 of the auxiliary piston rod 366 thereto. Pivotally connected as at 388 to the upper end of the angle bracket 386 is the lower arm 390 of a collapsible link 392. The upper end of the lower arm 390 is pivotally connected at 394 to the upper end of an upper arm 396 while the lower end thereof is pivotally connected at 398 to the rearward cylinder head 400 of the auxiliary cylinder 368.

In the operation of the further modified deceleration-responsive passenger-restraining device 200, let it be assumed, as before, that the buffer assembly 288 and its connected parts are in their retracted positions shown in solid lines in FIG. 5 with the upper portion 316 folded into its horizontal retracted position relatively to the lower portion 318 of the main pad 314 and held in that position by a detent latch (not shown) extending upward from the motor vehicle cowl into engagement with a detent lug 402 projecting from the upper end of the bracket 324 (FIG. 5). Let it also be assumed that the explosive gas generators 236, 308 and 364 are equipped with "live" cartridges like the cartridge 116 in FIG. 3, and that an emergency has resulted in a violent and sudden deceleration of the motor vehicle, either by drastic braking or by collision.

As a result, of this violent and sudden deceleration, the inertia switch (not shown) is energized to first actuate the auxiliary explosive gas generator 364 and cause explosive gas to enter the cylinder 368 of the auxiliary reciprocatory fluid pressure motor 360, causing its piston rod 366 and auxiliary or lower buffer 376 to move rearwardly in advance of the main or upper buffer 302, thereby pushing backward onto the front seat any child who might be inadvisedly standing in front thereof. An instant later, brought about by a predetermined time delay, the main explosive gas generator 236 is fired, causing explosive gas to enter the cylinder head 220 of each main cylinder 204, thereby propelling the piston rod 254 thereof and the main buffer 302 with its bent pad 314 to the right into the dotted line position shown at the right in FIG. 5. The inclined locking rings then lock the piston rods in their positions.

As soon as the lug 402 travels past the detent latch (not shown) projecting upward from the motor vehicle cowl, the upper portion 316 of the main buffer 302 is swung into a vertical position shown in the dotted lines at the right-hand end of FIG. 5, urged by the torsion spring 323. This action pulls the upper and lower arms 328 and 334 of the collapsible levers 330 into a straight-line position in substantial alignment with one another. Due to the fact, however, that the middle pivot pin 332 is laterally-offset relatively to the line of centers of the upper and lower pivot pins 326 and 346, as shown at the right-hand end of FIG. 5, the straightening of the collapsible levers 330 causes the axis of the tension spring 336 to come to rest to the left of the pivot pin 332 with a toggle action which holds the ends 342 and 344 of the upper and lower arms 328 and 334 in abutting engagement with one another. This toggle action forces the collapsible links 330 to remain in their straight positions from which they can be collapsed only by opposing pressure exerted at their midpoints adjacent the intermediate pivot pins 332 thereof. The gusset openings 322 permit the upper portion 316 of the main pad 314 to flex around the bending portion 320 therebetween. As a result of the foregoing action, the passengers are held downward against the seat bottoms 18 and backward against the seat backs 20 as in FIGS. 1 and 4 and thereby prevented from being thrown forward by the inertia of their bodies, with consequent injury and possible death.

Meanwhile, as the piston 244 has neared the end of its outward stroke, it has tripped and closed a normally-open limit switch (not shown) which in turn closed the energization circuit of the solenoid winding within the retro-firing explosive gas generator 308, causing it to fire. The consequent explosion propels exploded gases into the outer ends of the cylinders 216, halting further travel of the pistons 244. As a consequence, the travel of the buffer assembly 288 is instantly halted at a predetermined position after the main buffer 302 has locked by the one-way locking action of the tilted locking rings or washers 274 on the piston rods 254 (FIG. 6). The passengers P, thus restrained from hurtling forward in response to the violent deceleration of the motor vehicle, are protected from serious injury while at the same time the main and auxiliary buffers 372 and 376 (FIG. 5) are halted before their propulsion proceeds far enough rearwardly to cause injury to the passengers by their otherwise-unrestrained travel.

Even if the motor vehicle rolls over, the passengers are protected from serious injury by being held against the back 20 and bottom 18 of the front seat 16 and thus are protected from injury, assuming, of course, that the body pillars are sufficiently strong to prevent collapse of the roof 24. Such collapse could of course be easily prevented by the installation of the well-known inverted-U-shaped roll bar used by racing car drivers.

After the motor vehicle 12 has come to a halt, either in an upright or rolled-over position, the occupants can free themselves from the restraining action of the buffer assembly 288 by reaching through the steering wheel cutout opening 77 (FIG. 2) in the buffer 76 (FIGS. 1 and 2) or in the facing steering wheel cutouts (not shown) in the main buffer 302 and auxiliary buffer 376 then pushing forward upon the collapsible links 330 (FIG. 5) adjacent their intermediate pivot pins 332, thereby permitting the upper portion 316 of the main or upper buffer 314 to be bent downward. At the same time, a pull on the rod or cable leading to the release arm 282 (FIG. 6) pulls the washers 274 into a vertical unlocked position by overcoming the thrust of the coil springs 276 and thereby permits the piston rods 254 and consequently the buffer assembly 288 to be pushed forward toward the vehicle cowl 30.

MAGAZINE EXPLOSIVE GAS GENERATOR.

The magazine explosive gas generator, generally designated 410, shown in FIG. 7, provides means by which a plurality of cartridges can be moved successively into the firing position. It consists of a cup-shaped casing 412 mounted on a tubular stem 414 with a threaded lower end portion 416 and a passageway 418 extending longitudinally through the stem 414. The upper portion of the stem 414 is threaded as at 420 to receive the correspondingly-threaded hollow stem 422 of a plug 424 with an enlarged head 426. The plug 424 has a central bore 428 therethrough for slidably receiving an elongated firing pin 430 of magnetic material such as soft iron, which is urged downward by a compression coil spring 432 disposed in a counterbore 434 in a cylindrical closure member 436. The lower end of the spring 432 bears against an enlargement 438 on the firing pin 430 immediately above the head 426. Mounted inside the casing 412 upon an annular spacer 440 at the bottom thereof is a solenoid 442 consisting of a tubular core 444 having annular opposite end discs 446 secured to its opposite ends. Mounted in the annular space between the core 444 and the end discs 446 is a solenoid winding 448.

The cylindrical closure member 436 is reduced in diameter at its upper end to receive an annular cap 450 and is pressed downward by a leaf spring 452 similar to the leaf spring 240 in FIG. 5 and similarly welded or otherwise secured to the casing 412. The closure member 436 is provided with a central axial bore 454 slidably receiving the firing pin 430 and opening into the counterbore 434. The stem 414 intermediate its upper and lower ends is provided with a diametral slot 456 of rectangular cross-section in which a cartridge magazine 458 is slidably mounted. The cartridge magazine 458 is provided with a plurality of transverse bores 460 counterbored to receive the casings of center-fire pistol cartridges 462. The cartridge magazine 458 on its upper side 464 is provided with a series of hemispherical depressions 466 adapted to register with the ball 468 of a yieldable spring-pressed ball detent 470 in a socket 472 when each of the bores 460 is aligned with the passageway 418.

In the operation of the magazine explosive gas generator 410, let it be assumed that live blank cartridges 462 have been mounted in their respective bores 460 in the magazine 458, which has been temporarily withdrawn from the slot 456 with the ball detent 470 yielding upward from its engagement with the depressions 466 to permit withdrawal of the magazine 458 for this purpose. The thus loaded magazine 458 is then pushed back into the slot 456 and comes to rest when the detent ball 468 is springpressed into the adjacent depression 466. The threaded lower end portion 416 of the stem 414 is assumed to have been threaded into a correspondingly-threaded counterbore 474 which opens into a correspondingly-threaded bore 476 in the cylinder head 478 in which it is mounted.

When the circuit including the solenoid winding 448 has been closed by the action of the inertia switch as described above, the consequent magnetic force exerted upon the firing pin 430 forces its pointed lower end downward against the center of the first center-fire cartridge 462, detonating it and causing it to fire, whereupon the explosive gases pass through the passageways 418 and 476 into the cylinder chamber closed by the cylinder head 478 to propel the piston head thereof in a direction away from the cylinder head 478 and magazine explosive gas generator 410 mounted therein.

After the first cartridge 462 has been fired, the generator 410 can be reactivated by pushing inward to the left in FIG. 7 upon the magazine 458, so as to bring the second cartridge 462 into alignment with the passageway 418 in the stem 414. While this is being done, the ball 468 of the spring-pressed detent 470 yields so as to move out of the first detent depression 466 and into the second detent depression 466. The third detent depression consists of a concave annular bevel 480 upon the end of the magazine 458, which comes into engagement with the ball 468 when the magazine 458 is pushed further into the slot 456 to place the third cartridge 462 in firing position.

The cartridge-applied and cartridge-released brake assembly, generally designated 480, shown in FIG. 8 is adapted to be mounted adjacent the main piston rod 254 (FIG. 5) between the retro-firing explosive gas generator 308 and the flanged collar 298 for braking the travel of the piston rod 254. For this purpose the brake assembly 480 is mounted upon a suitable bracket structure 482, shown almost entirely broken away and omitted from FIG. 8 in order to avoid concealing the operating parts of the brake assembly 480. The bracket structure 482, however, is conveniently secured to the operating cylinder 204 (FIG. 5) adjacent the retro-firing explosive gas generator 308. The brake assembly 480 has a stationarily mounted pivot shaft 484 to which are pivoted the bosses 486 and 488 of lower and upper semi-cylindrical brake linings 494 and 496 respectively. Thus the bosses 486 are axially spaced on opposite sides of the central boss 488 and all three bosses are centrally bored for mounting upon the pivot shaft 484.

Pivotally mounted at 498 upon the end portion of the upper semi-cylindrical brake element 492 almost diametrically opposite its pivot boss 488 are the inner ends of a twin-armed brake-operating lever 500. The brake-operating lever 500 has its arms 502 interconnected remote from its pivots 498 by a shallow V-shaped bridge portion 504. Extending through and between the arms 500 of the brake-operating lever 500 is a link pivot rod 506 to the outer ends of which are pivoted the upper ends of brake-coupling links 508 (only one being shown in FIG. 8), the lower ends of which are pivoted at 510 to the opposite sides of the lower brake element 490 remote from the pivot shaft 484. A vertical compression coil spring 512 with its upper end engaging an abutment (not shown) engages and urges the bridge portion 504 and consequently the brake-operating lever 500 in a downward direction. A similar horizontal compression coil spring 514 similarly has its outer end engaging an abutment (not shown) and its inner end bearing against and urging inward a swinging plate 516, the upper edge of which engages the underside of the bridge portion 504 and the looped lower end of which is pivotally mounted upon a pivot pin 518.

The underside of the bridge portion 504 inward from the plate 516 is engaged by the upper end of the piston rod 520 of a brake-setting fluid pressure reciprocatory motor 522 having a cylinder 523, the lower end of which is provided with a cartridge-actuated explosive gas generator 525 similar to the explosive gas generator 100 of FIG. 3. The brake assembly 480 is also provided with a reciprocatory fluid pressure brake releasing motor 524, the piston rod 526 of which is provided at its forward end with a conical brake-expanding cam 528 which, upon advance or forward stroke of the piston rod 526, enters the gap 530 between the movable outer ends of the brake halves 490 and 492 and forces them apart, releasing the brake assembly 480. The cylinder 532 of the brake releasing motor 524 at its rearward end is provided with a cartridge-actuated explosive gas generator 534 similar to the explosive gas generator 100 of FIG. 3.

The operation of the cartridge-applied and cartridge-released brake assembly 480 as a unit in cooperation with the remaining components of the deceleration-responsive passenger restraining device of this invention is described below in connection with the operation of the amplified deceleration-responsive passenger-restraining device or system, generally designated 540, as shown in the flow sheet of FIG. 9. In its internal operation as shown in FIG. 8, the firing of the cartridge in the gas generator (not shown) at the lower end of the cylinder 523 of the brake-setting reciprocatory motor 522 suddenly injects into the cylinder 523 a charge of hot high-pressure gas which forces the piston of the piston rod 520 upward at high speed. This action in response to the striking force of the piston rod 520 against the bridge portion 504 of the brake operating lever 500 swings the lever 500 upward around the pivot rod 506, pulling the lower brake half 490 upward around the pivot shaft 484 through the force-transmitting action of the links 508 interconnecting the pivots 510 with the rod 506. At the same time, the consequent downward motion of the pivots 498 at the free end of the upper brake half 492, in response to the downward swinging of the inner end of the brake operating lever 500, swings the upper brake half 492 downward around the pivot shaft 484, thereby forcing the brake linings 494 and 496 into almost instantaneous braking engagement with the main piston rod 254. This action brings the piston rod 254 and the main buffer 302 to a momentary halt.

Shortly thereafter, in response to the further operation of the device as a whole (FIG. 9) as described below, the consequent firing of the cartridge in the explosive gas generator 534 suddenly fills the rearward end of the cylinder 532 of the brake-releasing motor 524 behind the piston head of the piston rod 526 thereof. This action almost instantaneously propels the piston rod 526 and conical brake expanding cam 528 forward into the gap 530 between the movable outer ends of the brake halves 490 and 492, forcing them apart and consequently releasing the grip of the brake linings 494 and 496 upon the main piston rod 254.

The amplified deceleration-responsive passenger-restraining device or system, generally designated 540, goes into action in response to the operation of an emergency or crash sensor (FIG. 9), such as the inertia-operated micro-switch 126 (FIG. 3) which emits a signal upon the occurrence of a crash or upon the drastic deceleration immediately prior to a crash. This signal is transmitted to the gas generator 364 shown in the lower left-hand corner of FIG. 5, causing the explosion of the cartridge therein to inject explosive gases into the inner end of the cylinder 368 of the auxiliary reciprocatory fluid pressure motor 360 behind the piston head of the piston rod 366 thereof. This action causes the piston rod 366 and the knee-restraint auxiliary buffer 376 to move rapidly outward into the dotted line position shown in FIG. 5, engaging the knees of the driver and/or front seat passenger, thereby preventing them from "submarining" or sliding downward and forward in response to their inertias.

As the knee restraint 376 moves outward, it closes a suitable switch 542 which instantly energizes the firing mechanism of the gas generator 236 so as to fire the explosive cartridge thereof. The resulting explosive gases are injected into the main cylinder or cylinders 204 of the main restraint or buffer 302 which consequently moves outward rapidly into the dotted line position of FIG. 5. Concurrently with the outward motion of the main restraint or buffer 302, the head restraint 316 moves upward from its solid-line horizontal position in the mid-portion of FIG. 5 to its vertical dotted-line position at the right-hand end of FIG. 5.

As the main restraint or buffer 302 moves outward into imminent engagement with the front seat occupant, a shutter (not shown) thereon intercepts the light beam of a first photoelectric cell device, generally designated 544, actuating a switch, which energizes the gas generator 525 and fires the cartridge therein. This action injects explosive gases into the lower end of the brake setting cylinder 523 below the piston head of the piston rod 520 causing the latter to move rapidly upward. As a result, the brake-operating lever 500 is swung rapidly upward, causing the lower and upper brake halves 490 and 492 to move toward one another and engage their respective brake linings 494 and 496 with the main restraint piston rod 254, halting its outward travel. At the same time, a second photoelectric cell device 546 connected in parallel with the first photoelectric cell device 544 mounted slightly ahead of the outwardly-traveling main buffer 314 and head restraint 316, actuating an emergency signal 548.

Meanwhile, the impact of the front seat occupant or occupants with the main restraint or barrier 302 actuates with an impact switch 550 which in turn energizes the brake releasing gas generator 534 by firing the cartridge thereof. As a result, the injection of explosive gases from the gas generator 534 into the cylinder 532 of the reciprocatory brake-releasing motor 524 behind the piston head thereof propels the piston rod 526 and conical brake-expanding cam 528 into the gap 530 between the free ends of the brake halves 490 and 492, forcing them apart as they pivot around the pivot shaft 484. With the brake assembly 480 thus unlocked and disengaged from the main piston rod 254, the main reciprocatory motor 202 thereof acts as a large and controlled shock absorber, moving inwardly as it absorbs the energy developed by the inertia of the front seat occupant or occupants impacting into the main buffer 302.

I claim:

1. A deceleration-responsive passenger-restraining device for installation in a motor vehicle having a passenger compartment with a steering wheel and a passenger seat therein, said device comprising
reciprocatory fluid pressure motor means adapted to be mounted on said motor vehicle and including cylinder means and piston means therein reciprocable relatively thereto and adapted to extend into the passenger compartment,
buffer means adapted to be disposed in the passenger compartment and operatively connected to said piston means for motion thereby from a retracted position remote from the seat to a passenger-restraining position adjacent the seat,
substantially instantaneously-burning explosive gas generating means having solid propellant cartridge receiving means adapted to receive such solid propellant cartridges and communicating with said cylinder means,
cartridge-firing means responsive to the attainment of a predetermined deceleration of the vehicle for firing the cartridge and thereby injecting exploded gases into said cylinder means for moving said piston means and consequently propelling said buffer means from its retracted position to its passenger restraining position,
said buffer means including a plate structure having a substantially rigid approximately vertical intermediate plate portion and also having a substantially rigid lower plate portion disposed angularly relatively to said intermediate portion and extending therebelow toward said cylinder means,
and braking means including a braking member movable into and out of braking engagement with said piston means,
said braking means being disposed adjacent said piston means and responsive to the travel of said buffer means a predetermined distance toward said passenger-restraining position for moving said braking member into braking engagement with said piston means and halting said piston means.

2. A deceleration-responsive passenger-restraining device for installation in a motor vehicle having a passenger compartment with a steering wheel and a passenger seat therein, said device comprising
reciprocatory fluid pressure motor means adapted to be mounted on said motor vehicle and including cylinder means and piston means therein reciprocable relatively thereto and adapted to extend into the passenger compartment,
buffer means adapted to be disposed in the passenger compartment and operatively connected to said piston means for motion thereby from a retracted position remote from the seat to a passenger-restraining position adjacent the seat,
substantially instantaneously-burning explosive gas generating means having solid propellant cartridge receiving means adapted to receive such solid propellant cartridges and communicating with said cylinder means,
cartridge-firing means responsive to the attainment of a predetermined deceleration of the vehicle for firing the cartridge and thereby injecting exploded gases into said cylinder means for moving said piston means and consequently propelling said buffer means from its retracted position to its passenger restraining position,
said buffer means including a plate structure having a substantially rigid approximately vertical intermediate plate portion and also having a substantially rigid lower plate portion disposed angularly relatively to said intermediate portion and extending therebelow toward said cylinder means,
and braking means including a braking member movable into and out of braking engagement with said piston means,
said braking means being disposed adjacent said piston means and responsive to the travel of said buffer means predetermined distance toward said passenger-restraining position for moving said braking member into braking engagement with said piston means and halting said piston means,
said braking means also including brake-applying explosive cartridge-firing means and further including brake-applying cylinder and piston means in communication therewith and operatively connected to said braking member for actuating said braking member in response to the firing of said brake-applying cartridge-firing means.

3. A deceleration-responsive passenger-restraining device, according to claim 2, wherein said braking means also includes brake-releasing explosive cartridge-firing means and further includes brake-releasing cylinder and piston means in communication therewith and operatively connected to said braking member for releasing said braking member in response to the firing of said brake-releasing cartridge-firing means.

4. A deceleration-responsive passenger-restraining device for installation in a motor vehicle having a passenger compartment with a steering wheel and a passenger seat therein, said device comprising
reciprocatory fluid pressure motor means adapted to be mounted on said motor vehicle and including cylinder means and piston means therein reciprocable relatively thereto and adapted to extend into the passenger compartment,
buffer means adapted to be disposed in the passenger compartment and operatively connected to said piston means for motion thereby from a retracted position remote from the seat to a passenger-restraining position adjacent the seat,
substantially instantaneously-burning explosive gas generating means having solid propellant cartridge receiving means adapted to receive such solid propellant cartridges and communicating with said cylinder means,
cartridge-firing means responsive to the attainment of a predetermined deceleration of the vehicle for firing the cartridge and thereby injecting exploded gases into said cylinder means for moving said piston means and consequently propelling said buffer means from its retracted position to its passenger restraining position, said buffer means including a plate structure having a substantially rigid approximately vertical intermediate plate portion and also having a substantially rigid lower plate portion disposed angularly relatively to said intermediate portion and extending therebelow toward said cylinder means, said plate structure including a substantially rigid upper plate portion disposed above and angularly relatively to said intermediate portion, said upper plate portion being hingedly connected to said intermediate plate portion, and resilient means interposed between said upper and intermediate plate portions and urges said upper plate portion into approximately coplanar relationship with said intermediate plate portion.

5. A deceleration-responsive passenger-restraining device, according to claim 4, wherein yieldable latch means is connected to said upper plate portion to releasably hold the same in angled position relatively to said intermediate plate portion and is adapted to cooperate with a coacting latch keeper adapted to be mounted on the motor vehicle to release said upper plate portion in response to firing of said explosive gas generating means.

6. A deceleration-responsive passenger-restraining device, according to claim 4, wherein collapsible toggle link means pivotally interconnects said upper and intermediate plate portions, and includes toggle links pivoted to one another at locations offset relatively to the line of centers of their pivotal connections to their respective plate portions and also includes stop shoulders disposed adjacent their pivotal connections to one another holding said toggle links in their straight line positions against force applied thereagainst in a forward direction of vehicle travel.

7. A deceleration-responsive passenger-restraining device for installation in a motor vehicle having a passenger compartment with a steering wheel and a passenger seat therein, said device comprising reciprocatory fluid pressure motor means adapted to be mounted on said motor vehicle and including cylinder means and piston means therein reciprocable relatively thereto and adapted to extend into the passenger compartment, buffer means adapted to be disposed in the passenger compartment and operatively connected to said piston means for motion thereby from a retracted position remote from the seat to a passenger-restraining position adjacent the seat, explosive gas generating means having solid propellant cartridge receiving means adapted to receive such solid propellant cartridges and communicating with said cylinder means, and cartridge-firing means responsive to the attainment of a predetermined deceleration of the vehicle for firing the cartridge and thereby injecting exploded gases into said cylinder means for moving said piston means and consequently propelling said buffer means from its retracted position to its passenger restraining position, said explosive gas generating means including first and second explosive gas generators communicating with said cylinder means at opposite ends thereof, and said cartridge firing means being constructed and arranged to fire said second explosive gas generator in opposition to said first explosive gas generator in response to the arrival of said piston means at a location adjacent the forward limit of its stroke.

8. A deceleration-responsive passenger-restraining device for installation in a motor vehicle having a passenger compartment with a steering wheel and a passenger seat therein, said device comprising reciprocatory fluid pressure motor means adapted to be mounted on said motor vehicle and including cylinder means and piston means therein reciprocable relatively thereto and adapted to extend into the passenger compartment, buffer means adapted to be disposed in the passenger compartment and operatively connected to said piston means for motion thereby from a retracted position remote from the seat to a passenger-restraining position adjacent the seat, explosive gas generating means having solid propellant cartridge receiving means adapted to receive such solid propellant cartridges and communicating with said cylinder means, and cartridge-firing means responsive to the attainment of a predetermined deceleration of the vehicle for firing the cartridge and thereby injecting exploded gases into said cylinder means for moving said piston means and consequently propelling said buffer means from its retracted position to its passenger restraining position, said buffer means including an upper buffer and a lower buffer disposed adjacent one another, said motor means including upper and lower reciprocatory fluid pressure motors operatively connected to said upper and lower buffers respectively, said gas-generating means including upper and lower explosive gas generators operatively connected respectively to said upper and lower motors, and said cartridge firing means including contrivances constructed and arranged to fire said lower motor slightly in advance of said upper motor.

* * * * *